United States Patent [19]

Shirai et al.

[11] Patent Number: 4,663,084

[45] Date of Patent: May 5, 1987

[54] ELECTROCONDUCTIVE COMPOSITIONS

[75] Inventors: Hirofusa Shirai, Chiisagata; Kenji Hanabusa, Ueda; Mitsutoshi Kitamura, Kawagoe; Nobumasa Hojo, Ueda; Okikazu Hirabaru, Miyakonojo, all of Japan

[73] Assignee: TDK Corporation, Tokyo, Japan

[21] Appl. No.: 667,346

[22] Filed: Nov. 1, 1984

[30] Foreign Application Priority Data

Nov. 1, 1983 [JP] Japan ................................. 58-206805

[51] Int. Cl.$^4$ ............................................... G02B 5/20
[52] U.S. Cl. ................................... 252/600; 350/311
[58] Field of Search ................ 252/582, 600; 350/311; 260/429 R, 429 CY, 429 J

[56] References Cited

U.S. PATENT DOCUMENTS

| | | | |
|---|---|---|---|
| 2,155,038 | 4/1939 | Davies | 260/314 |
| 2,861,005 | 11/1958 | Siegel | 106/288 |
| 3,091,618 | 5/1963 | Fleysher | 260/314.5 |
| 3,148,933 | 9/1964 | Randall | 8/1 |
| 3,291,746 | 12/1966 | Donoian | 252/300 |
| 3,687,863 | 8/1972 | Wacher | 252/582 |
| 3,696,263 | 10/1972 | Wacher | 252/582 X |
| 3,743,964 | 7/1973 | Drexhage | 252/582 X |
| 3,853,783 | 12/1974 | Tucker | 252/300 |
| 3,900,323 | 8/1975 | MacLeish | 252/582 X |

FOREIGN PATENT DOCUMENTS

60-43605  3/1985  Japan ................................. 252/587
1164234  9/1969  United Kingdom .
1190410  5/1970  United Kingdom .

OTHER PUBLICATIONS

Yardley et al., "Laser-Produced Ultrafine Powders and Appl.", Reza Kenkyu, 12 (7) 394–400, 1984.
Huang, et al., "Electronic Transitions of Vanadyl Phthalocyanine", Chemical Physics 65 (1982) 205–216.
Kivits et al., "Vanadyl Phthalocyanine . . . ", Appl. Phys. A26, 101–105 (1981).
Pyatosin, "Study of the Photophysics", Opt. Spectrosc., (USSR) 52(2), Feb. 1982, 162–166.
Varnavskii et al., "Self-Synchronization of Laser", Sov. Tech. Phys. Lett. vol. 2 No. 10, Oct. 1976.
Byteva et al., "Quenching of Sensitized Luminescence", Russ. J. Phys. Chem. 56(7) 1982, pp. 1056–1058.
Morinaka et al., "Optical Recording Media . . . ", Appl. Phys. Lett. 43 (6), Sep. 15, 1983, pp. 524–526.
Shirai et al., "Functional Metal-Porphyrazine . . . ", Makromol. Chem. 180, 2073–2084 (1979).

*Primary Examiner*—John F. Terapane
*Assistant Examiner*—Catherine S. Kilby
*Attorney, Agent, or Firm*—Oblon, Fisher, Spivak, McClelland & Maier

[57] ABSTRACT

A novel metalo-phthalocyanine or an alkyl ester thereof in which each of two benzene nuclei of the four benzene nuclei condensed in the phthalocyanine ring has a carboxyl or alkoxy carbonyl radical attached thereto is well compatible with an organic polymer and thus provides an electroconductive polymer composition which may be formed into films or suitable articles.

12 Claims, No Drawings

ELECTROCONDUCTIVE COMPOSITIONS

This invention relates to electroconductive compositions, and more particularly, to electroconductive polymer compositions comprising metalo-phthalocyanine dicarboxylic acids or alkyl esters thereof.

BACKGROUND OF THE INVENTION

Great attention is recently drawn to metalo-phthalocyanines as electroconductive, photoconductive, and energy transducing materials, electrode materials, and catalysts because of the presence of a metal ion in a large $\pi$-electron conjugated system. Blends of metalo-phthalocyanines and polymers may be readily molded into films or the like. It is thus believed that a wide variety of highly functional polymer materials may be designed with ease. Metalo-phthalocyanines, however, are less compatible with conventional polymers, for example, polyacrylates and less soluble in organic solvents such as toluene. It is very difficult to evenly disperse metalo-phthalocyanines in polymers and there are thus obtained polymer compositions having low conductance.

The inventors previously synthesized metalo-phthalocyanine tetracarboxylic acids having —COOH radicals attached to the benzene nuclei of the phthalocyanine ring for the purpose of improving solubility and compatibility as reported in H. Shirai et al., Makromol. Chem., 180, 2073(1979). These metalo-phthalocyanine tetracarboxylic acids, however, are still insufficient in both solubility and compatibility.

It was expected that these metalo-phthalocyanine tetracarboxylic acids might be esterified with alcohols into alkyl esters having improved solubility. Unfortunately, the metalo-phthalocyanine tetracarboxylic tetraalkyl esters did not exhibit satisfactory conductivity because the alkyl moieties attached to the benzene nuclei create steric hindrance to prevent planar phthalocyanine rings of adjacent molecules from lying close together.

SUMMARY OF THE INVENTION

It is, therefore, a primary object of the present invention to provide an electroconductive composition comprising a metalo-phthalocyanine compound which has a high conductance and is easy to prepare and mold.

To achieve such objects, the present invention provides an electroconductive composition comprising (i) an electroconductive amount of a metalo-phthalocyanine or an alkyl ester thereof in which each of two benzene nuclei of the four benzene nuclei condensed in the phthalocyanine ring has a carboxyl radical or alkoxy carbonyl radical attached thereto, and (ii) an organic polymer.

BRIEF DESCRIPTION OF THE INVENTION

The metalo-phthalocyanine compounds contemplated herein are those in which two of the four benzene nuclei condensed in the phthalocyanine ring have carboxyl radicals or alkoxy carbonyl radicals attached thereto. The two benzene nuclei each having a carboxyl or alkoxy carbonyl radical attached thereto may be adjacent each other directly or via another intervening benzene nucleus in the phthalocyanine ring. In general, there are available mixtures of such two types of isomers. More specifically, the position at which the benzene nucleus has an alkyl or alkoxy carbony radical attached thereto is generally 3- or 4-position. This means that substituents are present at 3- and 3'-positions, 3- and 4'-positions, 4- and 3'-positions, 4- and 4'-positions, 3- and 3"-positions, 3- and 4"-positions, 4- and 3"-positions, or 4- and 4"-positions. There are usually available mixtures of such isomers.

The substituents which are present on these positions of two benzene nuclei are carboxyl radicals and alkoxy carbonyl radicals. Under usual preparation conditions, the substituents are both carboxyl radicals or both alkoxy carbonyl radicals, forming a metalo-phthalocyanine dicarboxylic acid or a dialkyl ester thereof.

The alkyl moiety of the alkoxy carbonyl radicals may generally be unsubstituted one containing 1 to about 30 carbon atoms although it may be substituted one.

The metal atoms present at the center of the metalo-phthalocyanines are not particularly limited and include Fe, Cu, Co, Ni, V, Pb, Si, Ge, Sn, Al, Ru, Ti, Zn, Mg, Mn, and VO. The preferred metal atoms are iron, copper, cobalt, and nickel. It is also contemplated that one or two other ligands coordinate to the phthalocyanine ring at either side.

Synthesis of these metalo-phthalocyanine compounds will be described.

First, metalo-phthalocyanine dicarboxylic acid alkyl esters may be synthesized by mixing trimellitic anhydride, phthalic anhydride, a metal chloride, and urea and causing them to react in nitrobenzene in the presence of ammonium molybdate catalyst. The trimellitic and phthalic anhydrides may preferably be used in equimolar amounts. The reaction product is then recovered, for example, by Soxhlet extraction with methanol, obtaining $MtPc(CONH_2)_x$ where Mt is a metal atom, Pc is a phthalocyanine ring, and x is a positive integer having a value of 1 to 4 inclusive. This intermediate $MtPc(CONH_2)_x$ is then hydrolyzed with potassium hydroxide KOH, for example, at a temperature of about 100° C. The precipitate is filtered, washed with water, and purified with potassium hydroxide, obtaining $MtPc(COOH)_x$. This product is then refluxed in the presence of thionyl chloride $SOCl_2$, evaporated, washed, and dried, obtaining $MtPc(COCl)_x$. This intermediate is then reacted with an alcohol corresponding to the alkyl of the destined alkyl ester, for example, for about 10 hours at about 100° C. The product is filtered, rinsed, and dried, obtaining $MtPc(COOR)_x$ where R is an alkyl radical.

The product $MtPc(COOR)_x$ is then dissolved in benzene, for example, and developed in a silica gel column using a benzene/ethanol developer. The liquid portion that initially drops out is evaporated and dried, obtaining the dicarboxylic acid ester $MtPc(COOR)_2$. The resultant product $MtPc(COOR)_2$ is a mixture of various isomers as mentioned above, and develops peaks at $\nu(C=O)$ 1720 cm$^{-1}$ and $\nu(CH_2)$ 2900 cm$^{-1}$ in the infrared absorption spectrum independent of the number of carbon atoms in the alkyl radical.

The metalo-phthalocyanine dicarboxylic acids may be synthesized by refluxing the above-prepared product $MtPc(COOR)_2$ with a 1N potassium hydroxide/ethanol solution for hydrolysis followed by isolation and purification.

Alternatively, 2,2-bis(p-trimellitic phenyl)propane dianhydride and phthalic anhydride are reacted, preferably in equimolar amounts, in the same manner as previously described. The product is then extracted with methanol, for example, for isolation and further hydrolyzed in a similar manner and purified, obtaining a dicarboxylic acid MtPc(COOH)$_2$. In this case, the carboxyl (COOH) radicals are attached to the benzene nuclei adjacent each other via an intervening benzene nucleus.

The dicarboxylic acid MtPc(COOH)$_2$ product prepared by either of the above-mentioned procedures develops a peak at $\nu$(C=O) 1680 cm$^{-1}$ in infrared absorption spectrum.

An ester MtPc(COOR)2 may also be prepared by esterifying a dicarboxylic acid MtPc(COOH)2 having two carboxyl COOH radicals attached to those benzene nuclei adjacent each other via an intervening benzene nucleus in the same manner as previously described.

Some illustrative, but non-limiting, examples of the phthalocyanine compounds according to the present invention are given below.

Synthesis 1

A 500-ml three-necked separable flask was charged with a mixture of 8.2 g (0.06 mol) of trimellitic anhydride, 10.6 g (0.06 mol) of phthalic anhydride, 4.8 g ($3.7 \times 10^{-2}$ mol) of nickel chloride, and 60 g (1.0 mol) of urea and further with 100 ml of nitrobenzene. The reactants were agitated for reaction in the presence of ammonium molybdate catalyst at 160° to 170° C. for 2 hours. At the end of reaction, a solid reaction product was Soxhlet extracted with methanol for 48 hours to remove the unreacted reactants and nitrobenzene and then dried in vacuum at 50° C. It was analyzed by infrared spectroscopy.

IR (KBr): 1650 cm$^{-1}$ [$\nu$(C=O) of —CONH$_2$].

A 2-liter three-necked flask was charged with 20 g of the product NiPc(CONH$_2$)$_x$, 500 g of potassium hydroxide, and 500 g of distilled water. The mixture was agitated for 24 hours at 100° C. After the reaction was complete, the product was collected on a G4 filter, dissolved in about 3 or 4 liters of water, and removed of insolubles by passing through a G4 filter. The filtrate was adjusted to an acidic level (pH 2) by adding 6N aqueous hydrochloric acid thereto, and the resulting blue precipitate was filtered.

The precipitate was then dissolved in about 3 or 4 liters of 2 to 5% aqueous potassium hydroxide, purified in the same manner as above, dried at 150° C., fully triturated in a mortar, and further dried in vacuum at 70° C., obtaining NiPc(COOH)$_x$ in a yield of about 30 to 40% by weight. The product was analyzed by infrared spectroscopy.

IR (KBr): 1720 cm$^{-1}$ [$\nu$(C=O) of —COOH].

Then 5 g of the product NiPc(COOH)$_x$ was refluxed for 10 hours along with 20 ml of thionyl chloride. After the reaction was complete, the thionyl chloride was removed by evaporation and the reaction product was fully washed with dewatered benzene and dried in vacuum at 50° C.

Then 5 g of the product NiPc(COCl)$_x$ was mixed with 20 ml of decyl alcohol and the reaction was effected at 100° C. for 10 hours. Methanol was added to the product and the product was recovered by filtration, thorough washing with methanol again, and drying in vacuum at 50° C. The solid product was dissolved in benzene and insolubles were removed by normal filtration. The filtrate was evaporated and the residue was dried in vacuum at 50° C., obtaining NiPc-(COOC$_{10}$H$_{21}$)$_x$. Infrared analysis was carried out.

IR (KBr): 1720 cm$^{-1}$ [$\nu$(C=O) of COOC$_{10}$H$_{21}$].

The product NiPc(COOC$_{10}$H$_{21}$)$_x$ was dissolved in benzene and isolated by thin layer chromatography using a 3/1 (volume) benzene/ethanol mixture as a developer.

The same product NiPc(COOC$_{10}$H$_{21}$)$_x$ was dissolved in benzene and developed in a column filled with silica gel (trade name WaKogel C 200) using a 3/1 (volume) benzene/ethanol mixture as a developer. Blue liquid initially dropped out and was collected and evaporated. The residue was dried in vacuum at 50° C., obtaining the diester NiPc(COOC$_{10}$H$_{21}$)$_2$ which was analyzed by infrared spectroscopy, electromagnetic spectroscopy, and elemental analysis.

Infrared spectroscopy: IR (KBr): 1720 cm$^{-1}$ [$\nu$(C=O)]; 2900 cm$^{-1}$ [$\nu$(CH$_2$)].

Electromagnetic spectrum: λmax (log $\epsilon$): 664 nm (4.32), 606 nm (4.47), and 470 nm (3.35).

Elemental analysis:

|  | C | N | H | Metal |
|---|---|---|---|---|
| Found, % | 66.8 | 11.43 | 5.97 | 7.06 |
| Calcd., % | 69.01 | 11.92 | 6.01 | 6.20 |

It should be noted that the product NiPc(COOC$_{10}$H$_{21}$)$_2$ is a mixture of isomers as mentioned previously.

Synthesis 2

The procedure of Synthesis 1 was repeated except that the starting reactant NiCl$_2$ was replaced by CuCl$_2$. There wa obtained CuPc(COOC$_{10}$H$_{21}$)$_2$. The analytical results are shown below.

Infrared spectroscopy: IR: $\nu$(C=O) 1720 cm$^{-1}$; $\nu$(CH2) 2900 cm$^{-1}$.

Electromagnetic spectrum: λmax (log $\epsilon$): 681 nm (4.94), 673 nm (4.95), and 611 nm (4.85).

Elemental analysis:

|  | C | N | H | Metal |
|---|---|---|---|---|
| Found, % | 67.54 | 11.14 | 6.03 | 6.25 |
| Calcd., % | 68.66 | 11.86 | 5.98 | 6.73 |

Synthesis 3

The procedure of Synthesis 1 was repeated except that the central metal was varied among Fe, Co, Ni, and Cu, and the alcohol used for esterification was replaced by alcohols having not more than 30 carbon atoms. The infrared spectroscopy showing the same data for $\nu$(C=O) and $\nu$(CH$_2$) as above and elemental analysis proved that the products conformed to MtPc(COOR)$_2$.

Synthesis 4

The product NiPc(COOC$_{10}$H$_{21}$)$_2$ prepared in Synthesis 1 was refluxed for 2 hours along with 1N potassium hydroxide/ethanol solution. The product was isolated and purified in the same manner as in Synthesis 1. It was analyzed by infrared spectroscopy.

IR (KBr): 1680 cm$^{-1}$ [$\nu$(C=O) of —COOH].

Then $2.5 \times 10^{-5}$ of the product NiPc(COOH)$_2$ was dissolved in 20 ml of 0.01N aqueous potassium hydroxide. The pH of this system was measured by a pH meter ORION RESEARCH Model 701A while being back titurated with 0.05N aqueous hydrochloric acid. By recording the pH with respect to the amount of hydrochloric acid added, a tituration curve was obtained from which the concentration of COOH was determined.

Found: 14.31%, Calcd.: 13.64%.

The results of electromagnetic and elemental analysis are shown below.

Electromagnetic spectrum: λmax (log ε): 679 nm (4.02), 603 nm (4.11), and 472 nm (3.17).

Elemental analysis:

|  | C | N | H | Metal |
|---|---|---|---|---|
| Found, % | 57.75 | 16.04 | 2.63 | 9.38 |
| Calcd., % | 61.87 | 16.98 | 2.45 | 8.91 |

Synthesis 5

There was obtained CuPc(COOH)$_2$ by repeating the procedure of Synthesis 4 except that CuPc-(COOC$_{10}$H$_{21}$)$_2$ was used. The analytical results are shown below.

Infrared spectroscopy: IR (KBr): ν(C=O) 1680 cm$^{-1}$.

Electromagnetic spectrum: λmax (log ε): 690 nm (4.17) and 605 nm (4.55).

Elemental analysis:

|  | C | N | H | Metal |
|---|---|---|---|---|
| Found, % | 59.54 | 16.44 | 2.47 | 9.15 |
| Calcd., % | 61.42 | 16.14 | 2.43 | 9.56 |

The corresponding Fe and Co complexes showed the same infrared spectroscopic data and were found by elemental analysis to conform to MtPc(COOH)$_2$.

Synthesis 6

By following the procedure of Synthesis 1, 30 g of 2,2-bis(p-trimellitic phenyl)propane dianhydride and 10.6 g of phthalic anhydride were reacted with nickel chloride and urea and then Soxhlet extracted with methanol. After dried, 5 g of the product was dissolved in a minimum volume of concentrated sulfuric acid, genlty poured into a one-liter beaker filled with ice, and allowed to precipitate. Distilled water was added to the beaker to a total volume of one liter. The precipitate was filtered and washed with distilled water until neutral. It was dried in vacuum and then refluxed for 24 hours along with 50% potassium hydroxide/ethanol. The resulting material was isolated and purified in the same manner as in Synthesis 1.

Infrared spectroscopy: IR (KBr): 1680 cm$^{-1}$ [ν(C=O) of —COOH].

With respect to elemental analysis and electromagnetic spectrum, this material was the same as the product of Synthesis 4.

It was found in this case that the carboxyl (—COOH) radicals were attached at the 3-position and 3''- or 4''- position.

These phthalocyanine compounds may be mixed with organic polymers to form electroconductive compositions according to the present invention.

The organic polymers used herein are not particularly limited and some illustrative, non-limiting, examples thereof include vinyl resins, vinylidene resins, polyurethanes, polyesters, polyamides, cellulose derivatives, epoxy resins, phenolic resins, polyethylene, polypropylene, and other organic high molecular weight polymers.

The phthalocyanine compounds and polymers may be blended such that the resulting compositions may contain about 1 to 80% by weight of the polymers.

The electroconductive compositions comprising the phthalocyanine compounds and polymers according to the present invention may be molded or formed into articles of manufacture in a conventional manner, for example, by the following methods.

One method is by milling the phthalocyanine compound and polymer, preferably with a suitable solvent added, in a mixing vessel, for example, a ball mill, yielding an electroconductive paint or coating composition. The composition is then coated onto a suitable substrate to form a film of the electroconductive composition, optionally by evaporating off the solvent.

Alternatively, the phthalocyanine compound and polymer, preferably with a suitable solvent added, are milled and molded into a film or pellet, optionally by evaporating off the solvent.

The optional solvents which can be added to the instant compositions include ketones such as methyl ethyl ketone, methyl isobutyl ketone, cyclohexanone, etc.; aromatic solvents such as toluene, xylene, etc.; halide solvents such as dichloroethane, trichlene, etc.; alcohols such as methanol, ethanol, propanol, methyl cellosolve, ethyl cellosolve, etc.; and esters such as butyl acetate, ethyl acetate, carbitol acetate, butylcarbitol acetate, etc.

The amount of solvent added may generally be about 5 parts or less, preferably about 1 to about 5 parts per part by weight of the polymer.

In the preferred embodiment, the electroconductive compositions of the present invention are further doped with dopants to improve electroconductive properties.

The dopants which can be used herein may be any of ionic dopants. Among them particularly preferred are acids such as hydrochloric acid, sulfuric acid, nitric acid, perchloric acid, and sulfur trioxide (SO$_3$) and halogens such as iodine, bromine, and chlorine because of the greatest improvement in conductance.

The polymer compositions may generally be doped with these dopants in a concentration of not more than 100 mol%, preferably 0.1 to 10 mol% based on the molar amount of the phthalocyanine residue in the polymer. The polymer compositions may be doped by maintaining them in contact with dopants in vapor phase at a temperature of from room temperature to about 80° C. for a certain period of time varying from 5 minutes to 5 days.

Also included in the electroconductive compositions of the present invention are fillers such as carbon black and calcium carbonate, pigments, various magnetic powders and the like.

The electroconductive compositions of the present invention are very useful in a variety of applications as various electroconductive paints; magnetic layers, topcoats, undercoats, and backcoats on magnetic recording media; and various electroconductive films and pellets.

The present invention has a number of benefits. First, the metalo-phthalocyanine compounds of the present invention in which two benzene nuclei in the phthalocyanine ring have carboxyl or alkoxycarbonyl radicals attached thereto, respectively, are more soluble than those compounds without such substituents or tetracarboxylic acids and their esters having four such substituents attached to the benzene nuclei. More specifically, the metalo-phthalocyanine compounds of the present invention are well soluble in organic solvents such as chloroform, benzene, toluene, dioxane, dimethylformamide, methyl ethyl ketone, etc.

They are also highly compatible with resins such as epoxy resins, vinyl chloride-vinyl acetate copolymers, and polyurethanes.

Their electrical conductive properties are not impaired as opposed to the tetracarboxylic acids and tetracarboxylic alkyl esters wherein steric hindrance prevents planar phthalocyanine rings of adjacent molecules from lying close together.

Ease of preparation is an additional benefit. The electroconductive compositions having high conductance are available at low cost.

Examples of the present invention are given below by way of illustration and not by way of limitation. Parts and percents are by weight.

EXAMPLES 1 AND 2

The phthalocyanine compounds obtained in Synthesis 1 through 6 were mixed with a mixture of a partial hydrolyzate of a vinyl chloride-vinyl acetate copolymer (vinyl chloride content 80%) and a polyurethane such that the blends contained 20% of the phthalocyanine compounds. To one part of the polymer blends was added 3 parts of a 1/1 methyl ethyl ketone/toluene mixture. The blends were milled for dispersion in a ball mill for 20 hours.

The blends were applied onto polyethylene terephthalate substrates by coating and dried into electroconductive films of 0.8 μm thick.

These electroconductive films were determined for conductance $\sigma$(/ohm-cm). Gloss was also measured at an incident angle of 60° using a gloss meter according to ASTM D 673. The results are shown in Table 1.

Some phthalocyanine compounds outside the scope of the present invention were also blended with the same polymeric material and formed into films only for comparison purpose. Control 1 uses nickel phthalocyanine tetracarboxylic acid and Control 2 uses nickel phthalocyanine tetracarboxylic tetradecyl ester.

TABLE 1

|  | Conductance $\sigma$./ohm-cm | Gloss* |
|---|---|---|
| Control 1 (tetra-COOH) | $2.0 \times 10^{-5}$ | L |
| Control 2 (tetra-COOC$_{10}$H$_{21}$) | $1.6 \times 10^{-5}$ | M |
| Synthesis 4 (di-COOH) | $3.9 \times 10^{-5}$ | M |
| Synthesis 1 (di-COOC$_{10}$H$_{21}$) | $2.6 \times 10^{-5}$ | H |

*Gloss
H: higher than 70%
M: 40–70%
L: lower than 40%

As shown in Table 1, the films resulting from the present compositions achieve improvements in conductance, gloss, and dispersion. Improved gloss designates improvements in surface roughness and improved dispersion designates good compatibility between phthalocyanine compound and polymer.

Similar results were obtained from a composition of 60 parts of a phenoxy resin (trade name, "PKHH", manufactured by UCC Corporation) and 40 parts of a phthalocyanine compound and a composition of 50 parts of a polyvinylidene chloride (trade name, "Saran", manufactured by Dow Chemical Company) and 50 parts of a phthalocyanine compound.

EXAMPLES 3 TO 8

The films obtained in Examples 1 and 2 were doped with various dopants, iodine (I$_2$), hydrogen chloride (HCl), and sulfur trioxide (SO$_3$) by maintaining the films in contact with the dopant gas at 25° C. for 24 hours. The doped films were measured for conductance. The results are shown in Table 2.

TABLE 2

| Example | Dopant Pt | Type | Concentration* | Conductance $\sigma$./ohm-cm |
|---|---|---|---|---|
| 3 | Synthesis 4 | I$_2$ | 0.14 mol % | $10^{-2}$ |
| 4 | Synthesis 4 | HCl | 0.05 mol % | $10^{-1}$–$10^{-2}$ |
| 5 | Synthesis 4 | SO$_3$ | 0.03 mol % | $10^{1}$–$10^{0}$ |
| 6 | Synthesis 1 | I$_2$ | 0.10 mol % | $10^{-3}$ |
| 7 | Synthesis 1 | HCl | 0.07 mol % | $10^{0}$–$10^{-1}$ |
| 8 | Synthesis 1 | SO$_3$ | 0.03 mol % | $10^{1}$–$10^{0}$ |

*The concentration of dopant in polymer composition is expressed in mol percent based on the molar amount of the phthalocyanine residue in the composition.

The data in Table 2 shows that the incorporation of dopants in phthalocyanine-polymer films increases the conductance of the films by a factor of about $10^2$ to $10^6$.

What is claimed is:

1. An electroconductive composition comprising
   (a) an electroconductive amount of 20–99% by weight of a metalo-phthalocyanine or an alkyl ester thereof in which each of two benzene nuclei of the four benzene nuclei condensed in the phthalocyanine ring has only one carboxyl or alkoxy carbonyl radical attached thereto, and
   (b) an organic polymer.

2. The composition according to claim 1 wherein the radical attached to each of the substituted benzene nuclei is a carboxyl radical.

3. The composition according to claim 1 wherein the radical attached to each of the substituted benzene nuclei is an alkoxy carbonyl radical.

4. The composition according to claim 1 wherein the carboxyl or alkoxy carbonyl radical is attached to each of the benzene nuclei at their respective 3- or 4-positions.

5. The composition according to claim 4 wherein the carboxyl or alkoxy carbonyl radicals are present at positions selected from the group consisting of 3- and 3'-positions, 3- and 4'-positions, 4- and 3'-positions, 4- and 4'-positions, 3- and 3"-positions, 3- and 4"-positions, 4- and 3"-positions, 4- and 4"-positions, and combinations thereof.

6. The composition according to claim 1 wherein the alkyl of the alkoxy carbonyl radical is unsubstituted one containing 1 to about 30 carbon atoms.

7. The composition according to claim 1 wherein the central metal atom is selected from iron, copper, cobalt, and nickel.

8. The composition according to claim 1 wherein the polymer is selected from vinyl resins, vinylidene resins, polyurethanes, polyesters, polyamides, cellulose derivatives, epoxy resins, phenolic resins, polyethylene, and polypropylene.

9. The composition according to claim 1 wherein the polymer is present in an amount of 1 to 80% by weight of the composition.

10. The composition according to claim 1 which is further doped with a dopant.

11. The composition according to claim 10 wherein the dopant is selected from the group consisting of hydrochloric acid, sulfuric acid, nitric acid, perchloric acid, sulfur trioxide, iodine, bromine, and chlorine.

12. The composition according to claim 10 wherein the dopant is present in the composition in a concentration of 0.1 to 10 mol% of the molar amount of the phthalocyanine in the composition.

* * * * *